MULTISURFACE CROSS POINT SWITCHING MECHANISMS

Filed Nov. 29, 1960

3 Sheets-Sheet 1

INVENTORS
P. J. GRUNFELDER
E. C. PROEHLE
L. L. SEVEBECK
BY Albert R. Hodges
ATTORNEY Feb. 4, 1964 P. J. GRUNFELDER ETAL 3,120,584

MULTISURFACE CROSS POINT SWITCHING MECHANISMS

Filed Nov. 29, 1960

3 Sheets-Sheet 2

INVENTORS
P. J. GRUNFELDER
E. C. PROEHLE
L. L. SEVEBECK

BY Albert R. Hodges

ATTORNEY

MULTISURFACE CROSS POINT SWITCHING MECHANISMS

Filed Nov. 29, 1960

INVENTORS
P. J. GRUNFELDER
E. C. PROEHLE
L. L. SEVEBECK
BY Albert R. Hodges
ATTORNEY 3,120,584
MULTISURFACE CROSS POINT SWITCHING MECHANISMS Philip J. Grunfelder, Mountainside, Elmer C. Proehle, New Providence, and Laurin L. Sevebeck, Mountainside, N.J., assignors to Western Electric Company, Incorporated, New York, N.Y., a corporation of New York Filed Nov. 29, 1960, Ser. No. 72,345
10 Claims. (Cl. 200—5)

This invention relates to multiple switching apparatus and, more particularly, to such apparatus that may be utilized in transmission systems using multifrequency signaling.

With the advent of telephone and data transmission circuits utilizing multifrequency signaling in place of dial pulses, a real need exists for simple, low-cost pushbutton switching mechanisms having long useful lives and requiring substantially no mechanical readjustments.

One example of the type of telephone transmission circuits utilizing multifrequency signaling within which the present multiple switching apparatus may be advantageously employed is shown in the copending application of the coinventors L. A. Meacham and F. West, Serial No. 759,474, filed September 8, 1958. That circuit employs an oscillator located at a telephone substation and powered over a telephone line, a pair of tuned circuits for establishing any one of a plurality of pairs of frequencies of oscillation of the oscillator, and means for connecting the oscillator to the telephone line and performing other switching functions as well. To utilize the oscillator of such a system, it is advantageous that an array of pushbuttons be mounted so as to operate contacts and determine the various combinations of pairs of frequencies provided by the tuned circuits and to perform the necessary switching functions.

An oscillator of the above-mentioned type has also been employed in circuits for transmitting data in the form of coded alternating-current multifrequency signals over available telephone networks. One such circuit is disclosed in the copending application of the coinventors M. V. Di Iorio, J. P. Grunfelder and L. L. Sevebeck, Serial No. 784,983, filed January 5, 1959. Transmitting data by such a system involves generating a plurality of alternating-current voltages of different frequencies, combining selected ones of these voltages so as to provide for each data character a coded multifrequency signal, transmitting such coded signals over a telephone network in space-time relationship, and effecting a determination of the component alternating-current voltages of the coded multifrequency signals sent over the network to provide a reading of each data character. As in the above-mentioned telephone transmission system, it is also here advantageous that an array of pushbuttons be mounted so as to operate contacts and determine any of the various combinations of multifrequency signals required for such coded multifrequency data transmission.

It is the general object of this invention, therefore, to provide reliable, low-cost multiple switching mechanisms requiring a minimum number of connections and being of such construction as to provide ease of manufacture and long maintenance-free operation.

In accordance with the present invention, there is provided a pushbutton controlled crosspoint switching assembly comprising a guide plate having associated therewith an array of pushbutton means, an expandable unitary spring conductor positioned below the guide plate and various ones of the pushbutton means in such a manner that a portion of the conductor is expanded upon the depression of any one of the pushbutton means, and circuit means comprising an array of switching crosspoints each axially aligned with one of the pushbutton means so as to provide engagement of that crosspoint of the circuit means aligned with a depressed pushbutton means and the expanded portion of the unitary spring conductor.

In one embodiment, the circuit means comprises a first plurality of expandable parallel spring conductors each of which is positioned below one row of the array of pushbutton means and a second plurality of expandable parallel spring conductors each positioned below the first plurality of conductors and a column of the array of pushbutton means.

In another embodiment, the circuit means comprises a printed circuit board having an array of apertures each axially aligned with one of the pushbutton means and having a printed circuit on at least one of its major faces that passes across various ones of the apertures so as to define switching crosspoints. The depression of one of the pushbuttons in this second embodiment expands a portion of the unitary conductor so as to engage the peripheral portions of that aperture of the printed circuit board axially aligned with the depressed pushbutton means.

A complete understanding of the invention may be obtained from the following detailed description of apparatus forming specific embodiments thereof, when read in conjunction with the appended drawings, in which.

Figure 1:
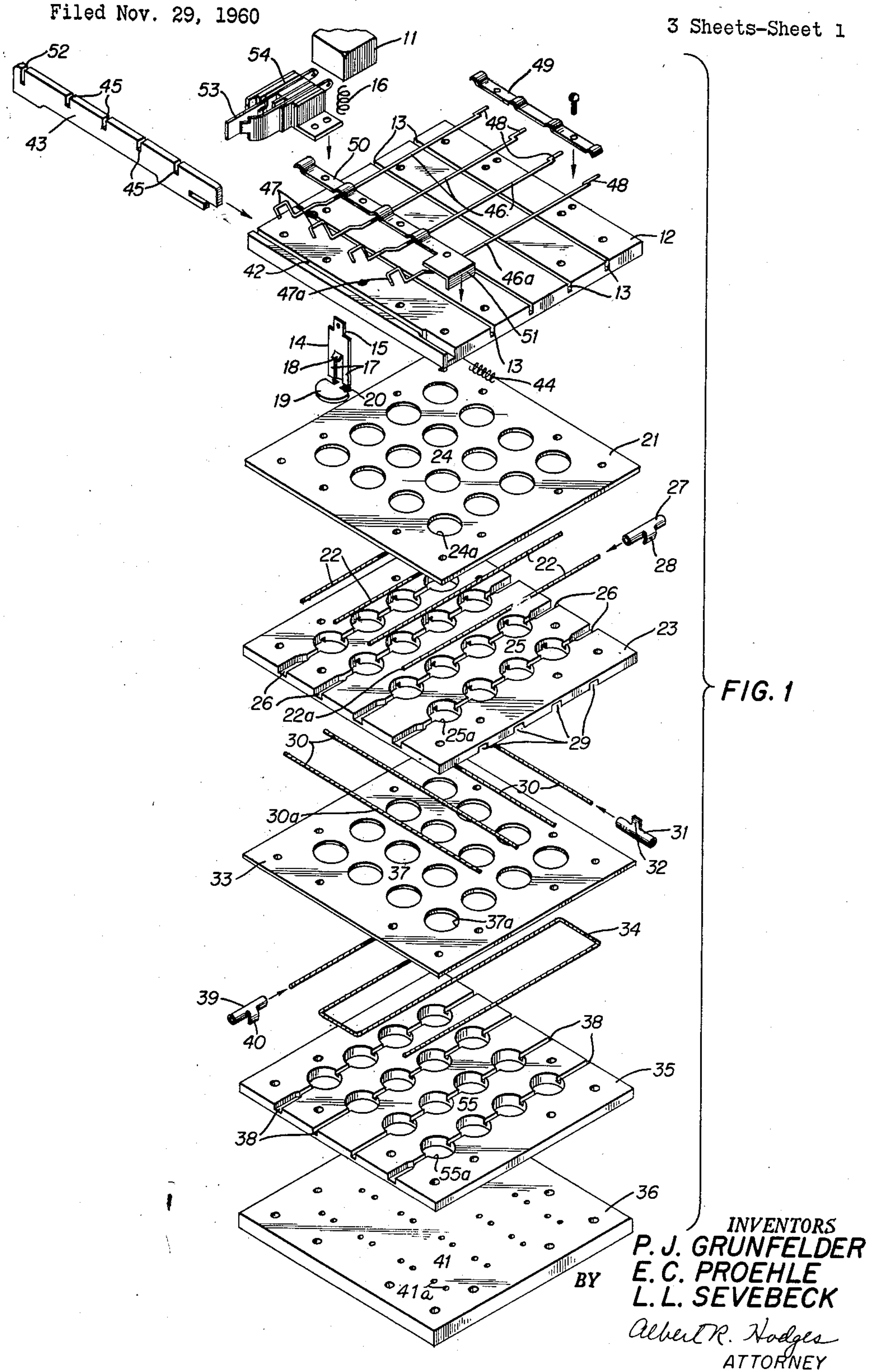
FIG. 1 is an expanded diagrammatic view of one embodiment of the present invention, which comprises a first and second plurality of expandable parallel spring conductors that define a plurality of switching crosspoints.
Figure 2:
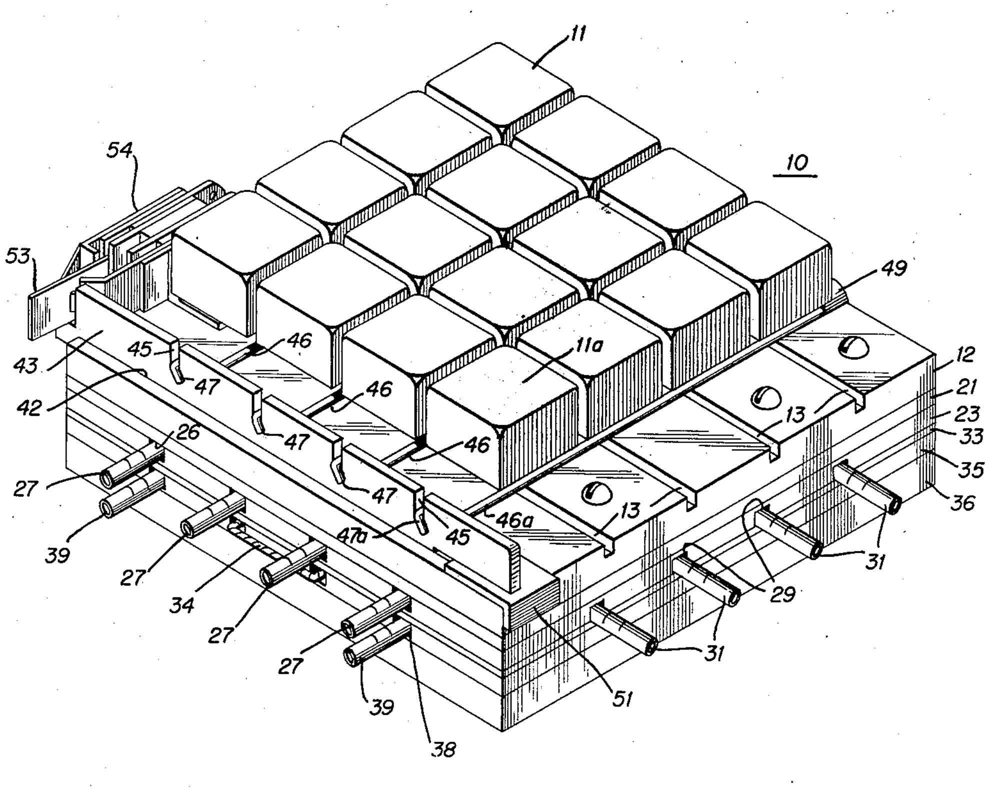
FIG. 2 is a perspective view of the embodiment shown in FIG. 1.

Referring to FIGS. 1 and 2, there is illustrated a switch assembly 10 comprising an array of sixteen pushbuttons 11 and a plurality of layers of insulator plates held together by conventional connecting means and between various ones of which there are positioned coiled spring contact wires 22, 30 and 34. More particularly, switch assembly 10 comprises an upper guide plate 12 having four transverse slots 13 extending down through one of its major faces to approximately one-half of its thickness. Along the valley of each of slots 13 and extending therefrom to the opposite major face of plate 12 are four equally spaced rectangular apertures (not shown) through which are passed key bars 14. Each of the key bars 14 has a shoulder and neck portion 15 that extends up from the top major face of plate 12, through a pushbutton support spring 16 and into a rectangular slot (not shown) in the bottom face of an associated pushbutton 11 to which it is fixedly connected. The bottom portion of each key bar 14 extends downward from plate 12 and is bifurcated so to define a pair of legs 17. Between each pair of legs 17 is positioned an insulator disk 19 having two slots 20 through which legs 17 extend. Key bar 14 has an angular stop 18 at the junction of its legs 17 which engages disk 19.

Below plate 12 there are positioned seriatim a spacer plate 21, a plurality of parallel coiled spring contact wires 22, a conductor holding plate 23, and a plurality of parallel coiled spring contact wires 30. Plates 21 and 23 are provided with arrays of apertures, 24 and 25, respectively, one aperture in each plate being in axial alignment with each key bar 14. Extending down through the upper major face of plate 23 to approximately one-half of its thickness are four parallel longitudinal slots 26. Each slot 26 cuts across one row of apertures of array 25 and has positioned therein one of the coiled spring contact wires 22. Further, the cross-section of each of the end portions of each of slots 26 is larger than that of its central portion and has positioned therein a clamp terminal 27 concentrically clamped to a portion of a contact wire 22. Terminal 27 has a protruding key 28 that locks into an aperture (not shown) extending down from the valley of each of the end portions of longitudinal slots 26. The lower major face of plate 23 has four parallel transverse slots 29 that are constructed in a manner similar to slots 26, but extended in a direction perpendicular to the latter so as to cut across four columns of apertures of array 25. The end portions of slots 29 have locking apertures (not shown) extending from their valleys toward the upper major face of plate 23. Positioned in slots 29 are coiled spring contact wires 30 each having clamp terminals 31 clamped to its ends. Terminals 31 have protruding keys 32, each of which is positioned in one of the last-mentioned locking apertures.

Below plate 23 and contact wires 30 there are positioned seriatim a spacer plate 33, a folded coiled spring ground wire 34, a ground support plate 35, and a lower guide plate 36. Spacer plate 33 and ground support plate 35 have, respectively, arrays of apertures 37 and 55, each aperture of which, like the apertures of arrays 24 and 25, is in axial alignment with a key bar 14. Extending down through the upper major face of ground support plate 35 to approximately one-half of its thickness are four parallel longitudinal slots 38 which cut across four rows of apertures of array 55. Within slots 38 and bending around the ends of plate 35 is the coiled spring ground wire 34. Terminals 39 are clamped to each of the end portions of ground wire 34 and are positioned in an enlarged end portion of the first and fourth longitudinal slots 38. Extending from the valleys of the enlarged portions of the first and fourth slots 38 are locking apertures (not shown) within which protruding keys 40 of terminals 39 are positioned. Lower guide plate 36 comprises an array of pairs of apertures 41 so located as to permit legs 17 of each of key bars 14 to pass at least partially into lower guide plate 36 when its associated pushbutton 11 is fully depressed.

In addition to transverse slots 13, there is provided in upper guide plate 12 a transverse slot 42. In slot 42 there is slideably positioned a slide bar 43 and a slide bar biasing spring 44, the latter being located in an enlarged end portion of slot 42. Extending down from the top surface of slide bar 43 are four vertical slots 45 within each of which is positioned one end 47 of one of a plurality of crank arms 46. Arms 46 are positioned perpendicularly to slide bar 43 in such a manner that each arm lies below a row of pushbuttons 11 and is rotated in a clockwise direction (looking toward that side of assembly 10 adjacent and parallel to slot 42) when at least one pushbutton of the row of pushbuttons 11 is depressed. More specifically, each of the crank arms 46 has a hook portion 47 at one end and a transverse displacement bend 48 at the other. To hold crank arms 46 perpendicular with respect to slide bar 43 and their central portions in an elevated position between the top major face of guide plate 12 and the bottom surfaces of various ones of said pushbuttons 11, but to permit rotational movement along their longitudinal axes, there are provided crank arm retainers 49 and 50 fixedly attached to upper plate 12. Retainer 50 differs from retainer 49 in that it has an extending angular flange 51 that holds slide biasing spring 44 within the enlarged portion of slot 42. Near the end of slide bar 43 furthest from biasing spring 44 there is a slot 52 within which is disposed a spring contact arm 53 of a spring contact switch 54, the latter being fixedly connected to upper guide plate 12.

The operation of switch assembly 10 is best explained by examining the interrelationship of the various components during the downward movement of one of the plurality of pushbuttons, for example the pushbutton shown as 11*a* in the drawing. As is evident from FIG. 1, each of pushbuttons 11 is held above upper guide plate 12 by pushbutton support spring 16 placed about that portion of key bar 14 that lies above plate 12. Since insulator disks 19 are fixedly connected to their associated pushbuttons 11 by means of key bars 14, they are held in an elevated position above the plane defined by unexpanded coil spring wires 22 during the time their associated pushbuttons are not depressed. Further, during this time that no one of pushbuttons 11 is depressed, the expansive force of slide bar biasing spring 44, held within the enlarged portion of transverse slot 42 by extending flange portion 51 of retainer 50, forces slide bar 43 to hold spring contact arm 53 in a position opposed to its resilient condition. Upon pushbutton 11A being depressed, the associated key bar 14 and insulator disk 19 move down through the axially aligned apertures of the arrays 24, 25, 37 and 55. Specifically, disk 19 moves down through aperture 24*a*, engages coil spring contact wire 22*a* and forces the latter to expand down through aperture 25*a* as disk 19 moves therethrough. An insulator disk 19 continues its downward movement, it forces coiled spring contact wire 22*a* to engage coiled spring contact wire 30*a* and forces both these wires to expand through aperture 37*a* as disk 19 passes therethrough. Upon such passage, expanded and engaged wires 22*a* and 30*a* engage coiled spring ground wire 34, which in turn is partially expanded into aperture 55*a*. Pushbutton 11*a* is fully depressed when legs 17 of key bar 14 extended into apertures 41*a* and engage lower guide plate 36.

The above-described arrangement of coiled spring wires 22, 30 and 34 and the sequence in which they engage each other provide important manufacturing and operating advantages. First, since contact wires 22 and 30 engage each other and then simultaneously, in an electrical sense, engage coiled spring ground wire 34, there is not the danger of obtaining spurious oscillations when switch assembly 10 is used to activate various tank circuits of an oscillator of the type described in the above first-mentioned copending application; a chief cause for such spurious oscillations is the activation of such tank circuits at different instants of time. Secondly, the engagements of coiled spring wires 22, 30 and 34 are characterized by a wiping action between these wires caused by their expanding at the time they are being engaged, such wiping action providing self-cleaning contact surfaces. Thirdly, since the assemblement of coiled spring wires 22, 30 and 34 between the various plates 21, 23, 33 and 35 requires merely the positioning of these wires in their associated slots, no accurate initial adjustments are necessary. It has been found that coiled spring wires of substantially constant resilient characteristics, for example those comprised of half hard Phosphor bronze, utilized in the manner above described, have provided a switch assembly characterized by long maintenance-free operation.

In addition to the above-described function performed by the downward movement of pushbutton 11*a* to expand and engage the various coiled spring wires 22, 30 and 34, pushbutton 11*a* also engages during its downward motion crank arm 46*a* and forces it to rotate in a clockwise direction. Accordingly, the clockwise rotation of hook portion 47A of crank arm 46*a* positioned within vertical slot 45 forces slide bar 43 against slide bar biasing spring 44 so as to compress the latter. Such movement of slide bar 43 releases spring contact arm 53 and permits it to assume its resilient condition, thus permitting spring contact switch 54 to close a previously open pair of spring contacts. It will be apparent to one skilled in the art that pushbuttons 11, crank arms 46, slide bar 43 and spring contact switch 54 may be arranged in regard to each other so as to have switch 54 triggered at any desired predetermined instant during the downward movement of any one of pushbuttons 11.

Figure 3:
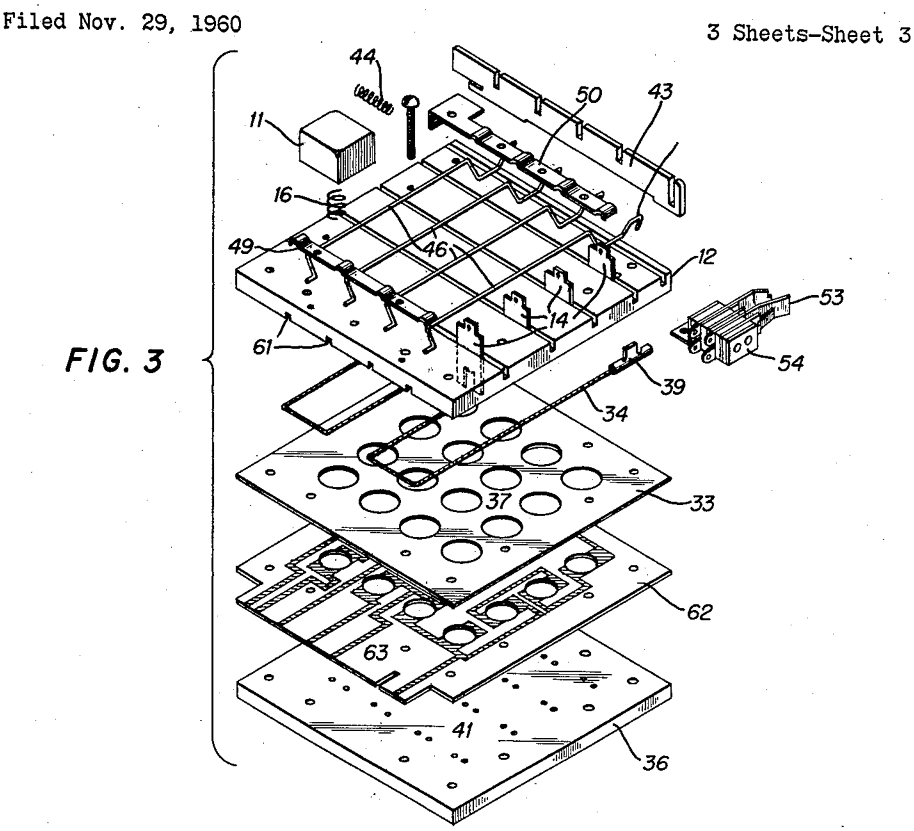
FIG. 3 is an expanded diagrammatic view of another embodiment, which comprises a printed circuit board having an array of apertures across various ones of which printed circuitry passes so as to define a plurality of switching crosspoints.
Figure 4:
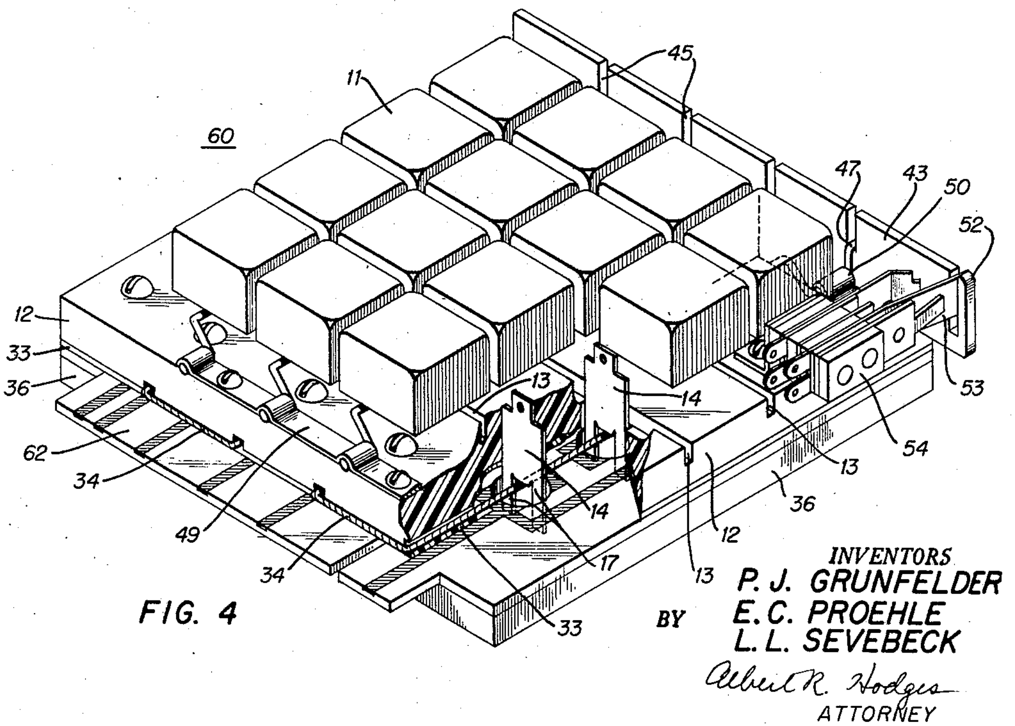
FIG. 4 is a partially cut-away perspective view of the embodiment shown in FIG. 3.

Referring to FIGS. 3 and 4, there is illustrated a second embodiment of the present invention having a somewhat simpler construction than that of the first embodiment illustrated in FIGS. 1 and 2. The same reference numerals have been utilized to denote components of both embodiments that substantially correspond.

Switch assembly 60 includes an upper guide plate 12 which differs from that of the first embodiment in that it comprises four longitudinal slots 61 extending up from its lower major face to approximately one-half of its thickness. Pushbuttons 11, crank arms 46, crank arm retainers 49 and 50, slot bar 43, spring contact switch 54, slide biasing spring 44, key bars 14 and pushbutton support springs 16 are arranged in the same manner as previously described with reference to the first embodiment. Each key bar 14 of assembly 60 differs from that of assembly 10 in that no angular stop 18 (FIG. 1) is provided. Within slots 61 of upper guide plate 12 is positioned coiled spring ground wire 34 and terminals 39 clamped to its end portions. Below plate 12 so as to form layers of insulator plates are positioned seriatim a spacer plate 33, a printed circuit board 62, and lower guide plate 36. Plates 33 and 36 are identical to those of assembly 10 (FIGS. 1 and 2). Printed circuit board 62 comprises an array of apertures 63 each of which is in axial alignment with a key bar 14 but smaller in diameter than the corresponding aperture in array 37 of spacer plate 33. The printed circuitry of board 62 lies partially on both major faces of the board and passes from one side to the other by way of conductive material on portions of the peripheries of various apertures of array 63. Such printed circuitry may be designed by one skilled in the art to provide the switching characteristics achieved with the coiled spring contact wires 22 and 30 of assembly 10.

The operation of switch 60 is best explained with reference to FIG. 4. As illustrated therein, coiled spring ground wire 34 passes between legs 17 of key bars 14 and across the apertures of array 63 of printed circuit board 62. Because of spacer plate 33 and the resilient character of coiled spring ground wire 34, the latter does not engage any portion of the printed circuit prior to the depression of a pushbutton 11. Upon the depression of a pushbutton 11, key bar 14 associated with the depressed pushbutton moves downwardly and forces ground wire 34 to expand down and through the apertures of arrays 37 and 63 axially aligned therewith. Upon such downward expansion ground wire 34 engages opposite peripheral conductive portions of the aperture of array 63 through which it is expanded. This engagement is characterized by a wiping action which provides self-cleaning contact surfaces. Accordingly, the corresponding above-noted advantage of switch assembly 10 is also present in switch assembly 60.

It will be appreciated that the above-described arrangements are merely illustrative of the principles of the invention. Numerous other arrangements and modifications may be devised by one skilled in the art without departing from the spirit and scope of the invention.

What is claimed is:

1. A pushbutton controlled crosspoint switching assembly for controlling electrical circuit comprising an array of pushbutton means, a guide plate for mounting said pushbutton means for linear movement, at least one expandable spring conductor, means for supporting said spring conductor below said guide plate and various ones of said pushbutton means to allow said conductor to be expanded by engagement with said pushbutton means upon the depression of any one of said pushbutton means, circuit means comprising an array of switching crosspoints, each axially aligned with one of said pushbutton means, means for supporting said circuit means in relationship to said spring conductor to allow engagement of that crosspoint of said circuit means aligned with a partially depressed pushbutton means with the expanded portion of said spring conductor, said pushbutton means being depressable beyond the point of providing engagement between said circuit means and said spring conductor to further expand said conductor and to provide a wiping contact between said conductor and said circuit means and means mounted between said circuit means and said spring conductor for insulating said circuit means from said unitary spring conductor when no one of said pushbutton means is depressed.

2. A pushbutton controlled crosspoint switching assembly for controlling electrical circuits comprising an insulator guide plate, an array of pushbutton means mounted for linear movement constrained by said guide plate, a first plurality of expandable parallel spring conductors each of which is positioned below one row of said array of pushbutton means, a second plurality of expandable parallel spring conductors each positioned below said first plurality of conductors and a column of said array of pushbutton means, said first and second plurality of expandable spring conductors forming a plurality of switching crosspoints each axially aligned below one of said pushbutton means, a unitary expandable spring conductor lying in a plane below said first and second plurality of conductors and having portions thereof aligned below each of said pushbutton means and said associated crosspoint, and a plurality of insulator plates each having an array of apertures axially aligned with one of said pushbutton means and being interpositioned between said first and second plurality of conductors and said unitary conductor so as to insulate them from each other when no one of said pushbutton means is depressed, whereby the depression of one of said pushbutton means expands one of said first conductors through an aperture of one of said insulator plates into engagement with one of said second conductors, and further expands each of said engaged first and second conductors through an aperture of second one of said insulator plates into engagement with said unitary conductor.

3. The combination in accordance with claim 2 wherein said plurality of insulated plates comprises a conductor holding plate between said first and second plurality of conductors having an array of apertures each axially aligned with one of said pushbutton means, a first plurality of parallel slots each extending down from one of its major faces and through a row of apertures of said array, a second plurality of parallel slots each extending up from the other major face and through a column of apertures of said array, said first and second plurality of slots having positioned therein said first and second plurality of conductors, respectively; a spacer plate having an array of apertures each axially aligned with one of said pushbutton means, said spacer plate being positioned between said second plurality of conductors and said unitary conductor; a ground support plate positioned below said spacer plate comprising an array of apertures each axially aligned with one of said pushbutton means and a plurality of parallel slots extending down from its top major face and through a row of apertures of said array, said unitary conductor being positioned within said plurality of slots; and a lower guide plate having a plurality of apertures extending down from one of its major faces through a portion of its thickness, said lower guide plate apertures being in alignment with each of said pushbutton means so as to permit each of said pushbutton means to be extended partially within said lower guide plate upon their being depressed.

4. The combination in accordance with claim 2 wherein each of said pushbutton means comprises a key bar having a shoulder and neck portion extending up through one aperture of an array of apertures in said guide plate and a bifurcated end portion extending below said guide plate, a pushbutton fixedly attached to said shoulder and neck portion of said key bar, and an insulator disk connected to said bifurcated portion.

5. The combination in accordance with claim 1 wherein said guide plate comprises a longitudinal slot one end of which has an enlarged cross-section portion, a slide bar slideably positioned within said slot, a slide bar biasing spring restrictively positioned in said enlarged portion of said slot for applying a biasing force against one end of said slide bar, a spring contact switch connected to the other end of said slide bar so as to be responsive to the movement of said bar, a plurality of crank arms hinged to said guide plate, each of said crank arms being connected to said slide bar and positioned below a row of pushbuttons of said array of pushbutton means so as to be rotated upon the depression of any one of said pushbuttons of said row, whereby the rotation of any one of said crank arms moves said slide bar toward said biasing spring.

6. The combination in accordance with claim 1 wherein said circuit means comprises a printed circuit board positioned below said expandable conductor and having an array of apertures each axially aligned with one of said pushbutton means, said printed circuit board having on at least one of its major faces printed circuits that extend to diametrically opposed portions of the periphery of various ones of said apertures of said last-mentioned array so as to define switching crosspoints, whereby the depression of one of said pushbutton means expands the portion of said conductor therebelow so as to engage the peripheral portions of that aperture of the printed circuit board axially aligned with said depressed pushbutton means.

7. The combination in accordance with claim 1, wherein said expandable spring conductor is a single, helically coiled wire positioned under all of said pushbutton means.

8. The combination in accordance with claim 1, wherein each of said pushbutton means comprises a key bar having a shoulder and neck portion extending up through one aperture of an array of apertures in said guide plate and a bifurcated end portion extending below said guide plate, a pushbutton fixedly attached to said shoulder and neck portion of said key bar, and an insulator disk connected to said bifurcated portion.

9. A pushbutton controlled crosspoint switching assembly for controlling electrical circuits comprising an insulator guide plate, an array of pushbutton means mounted for linear movement constrained by said insulator guide plate, a first plurality of expandable, parallel spring conductors each of which is positioned below one row of said array of pushbutton means, a second plurality of expandable, parallel spring conductors each positioned below said first plurality of conductors and a column of said array of pushbutton means, said first and second plurality of expandable spring conductors forming a plurality of switching crosspoints each axially aligned below one of said pushbutton means, another expandable spring conductor lying in a plane adjacent to said first and second plurality of conductors and having portions thereof lying below pushbutton means and adjacent to said associated crosspoints, and a plurality of insulator plates each having an array of apertures axially aligned with said pushbutton means and being interpositioned between said first and second plurality of conductors and said another conductor so as to insulate them from each other when none of said pushbutton means is depressed, whereby the depression of one said pushbutton means expands the conductors axially aligned therewith into the engagement of one another.

10. The combination in accordance with claim 9, wherein said another expandable spring conductor is a single, helically coiled wire positioned under all of said pushbutton means.

References Cited in the file of this patent

UNITED STATES PATENTS

| | | |
|---|---|---|
| 1,528,761 | Goff | Mar. 10, 1925 |
| 2,747,144 | Beers | May 22, 1956 |

FOREIGN PATENTS

| | | |
|---|---|---|
| 482,563 | Germany | Sept. 18, 1929 |
| 1,026,797 | Germany | Mar. 27, 1958 |
| 804,979 | Great Brtiain | Nov. 26, 1958 |

UNITED STATES PATENT OFFICE

CERTIFICATE OF CORRECTION

Patent No. 3,120,584 February 4, 1964

Philip J. Grunfelder et al.

It is hereby certified that error appears in the above numbered patent requiring correction and that the said Letters Patent should read as corrected below.

Column 4, line 32, for "extended" read -- extend --; column 5, line 64, for "circuit" read -- circuits --; column 6, line 10, strike out "unitary"; line 39, before "second" insert -- a --.

Signed and sealed this 23rd day of June 1964.

(SEAL)
Attest:

ERNEST W. SWIDER
Attesting Officer

EDWARD J. BRENNER
Commissioner of Patents